(12) United States Patent  
Hacigumus et al.

(10) Patent No.: US 9,183,253 B2  
(45) Date of Patent: Nov. 10, 2015

(54) SYSTEM FOR EVOLUTIONARY ANALYTICS

(71) Applicants: Vahit Hakan Hacigumus, San Jose, CA (US); Jagan Sankaranarayanan, Santa Clara, CA (US); Jeffrey LeFevre, Santa Cruz, CA (US); Junichi Tatemura, Cupertino, CA (US); Neoklis Polyzotis, Cupertino, CA (US)

(72) Inventors: Vahit Hakan Hacigumus, San Jose, CA (US); Jagan Sankaranarayanan, Santa Clara, CA (US); Jeffrey LeFevre, Santa Cruz, CA (US); Junichi Tatemura, Cupertino, CA (US); Neoklis Polyzotis, Cupertino, CA (US)

(73) Assignee: NEC Laboratories America, Inc., Princeton, NJ (US)

(*) Notice: Subject to any disclaimer, the term of this patent is extended or adjusted under 35 U.S.C. 154(b) by 421 days.

(21) Appl. No.: 13/890,359

(22) Filed: May 9, 2013

(65) Prior Publication Data

US 2014/0006383 A1  Jan. 2, 2014

Related U.S. Application Data

(60) Provisional application No. 61/664,971, filed on Jun. 27, 2012.

(51) Int. Cl.  
*G06F 17/30* (2006.01)

(52) U.S. Cl.  
CPC .... *G06F 17/30448* (2013.01); *G06F 17/30457* (2013.01); *G06F 17/30463* (2013.01); *G06F 17/30471* (2013.01)

(58) Field of Classification Search  
None  
See application file for complete search history.

(56) References Cited

U.S. PATENT DOCUMENTS

| | | | | |
|---|---|---|---|---|
| 7,606,827 B2 * | 10/2009 | Nica | ................ | G06F 17/30463 1/1 |
| 7,693,820 B2 * | 4/2010 | Larson | ............ | G06F 17/30457 707/999.002 |
| 7,991,765 B2 * | 8/2011 | Gui | .................. | G06F 17/30457 707/713 |
| 2006/0047696 A1 * | 3/2006 | Larson | ............ | G06F 17/30457 1/1 |
| 2007/0143246 A1 * | 6/2007 | Bestgen | ........... | G06F 17/30306 1/1 |
| 2007/0214107 A1 * | 9/2007 | Bello | ............... | G06F 17/30457 1/1 |

* cited by examiner

*Primary Examiner* — Debbie Le  
(74) *Attorney, Agent, or Firm* — Joseph Kolodka

(57) ABSTRACT

A system for evolutionary analytics supports three dimensions (analytical workflows, the users, and the data) by rewriting workflows to be more efficient by using answers materialized as part of previous workflow execution runs in the system.

19 Claims, 7 Drawing Sheets

SYSTEM FOR EVOLUTIONARY ANALYTICS

This application is a non-provisional of and claims priority to provisional application Ser. No. 61/664,971 filed on Jun. 27, 2012, the content of which is incorporated by reference.

BACKGROUND

The present invention relates to evolutionary analytics.

A knowledge-driven enterprise adopts an aggressive strategy of instrumenting every aspect of their business and encourages the employees to find value in the large amount of raw data collected. Data-driven decision making (DDD) leaves no part of the knowledge-driven enterprise immune to change as long as there is sufficient evidence in the data to support it. Organizations collect data as logs which may have unknown value, so performing Extract-Transform-Load (ETL) is not feasible due to the high expense of ETL. ETL requires a formal process that is expensive and requires knowledge apriori of what the data looks like and where the value resides. Logs are typically large, flat, and have low-structure adding to the complexity of ETL for typical database since this requires a database design with its structure completely pre-defined. For these reasons much of the data is never evaluated thoroughly and data analysts are needed for analyzing the ever increasing volume of data that modern organizations collect and producing actionable insights. As expected, this type of analysis is highly exploratory in nature and involves an iterative process: the data analyst starts with an initial query over the data, examines the results, then reformulates the query and may even bring in additional data sources, and so on. Typically, these queries involve sophisticated, domain-specific operations that are linked to the type of data and the purpose of the analysis, e.g., performing sentiment analysis over tweets or computing the influence of each node within a large social network.

Large-scale systems, such as MapReduce (MR) and Hadoop, perform aggressive materialization of intermediate job results in order to support fault tolerance. When jobs correspond to exploratory queries submitted by data analysts, these materializations yield a large set of materialized views that typically capture common computation among successive queries from the same analyst, or even across queries of different analysts who test similar hypotheses. Not surprisingly, MapReduce, be it the original framework, its open-source incarnation Hadoop or derivative systems such as Pig and Hive that offer a declarative query language, has become a de-facto tool for this type of analysis. Besides offering scalability to large datasets, MR facilitates incorporating new data sources, as there is no need to define a schema upfront and import the data, and provides extensibility through a mechanism of user-defined function (UDFs) that can be applied on the data.

UDFs are those outside the scope of standard operations available in relational databases and stores, such as SQL. An example of a typical UDF is a classification function. This may take as input a user_id and some text, then extracting some entities (objects, proper nouns) from the text and classifying the user's surrounding text as positive or negative sentiment about those entities. Since data value is unknown, an analyst usually lacks complete understanding of the data initially and will need to pose an initial query (workflow) then refine it as the current answer informs the next evolution of the query toward the final desired outcome. Furthermore complex functions such as UDFs often need tuned empirically through trial and error, analysts will often need to repeat and refine analytic tasks many times until their satisfaction with the outcome on the data.

Since the computational scope of a single MR job is limited, scientists typically implement a query as an ensemble of MR jobs that feed data to each other. Quite often, such queries are written in a declarative query language, e.g., using HiveQL or PigLatin, and then automatically translated to a set of MR jobs.

Despite the popularity of MR systems, query performance remains a critical issue which in turn affects directly the "speed" at which data analysts can test a hypothesis and converge to a conclusion. Some gains can be achieved by reducing the overheads of MR, but the key impediment to performance is the inherent complexity of queries that ingest large datasets and span several MR jobs, a common class in practice. A-priori tuning, e.g., by reorganizing or preprocessing the data, is quite challenging due to the fluidity and uncertainty of exploratory analysis.

SUMMARY

In one aspect, a system for evolutionary analytics supports three dimensions (analytical workflows, the users, and the data evolution) by rewriting workflows to be more efficient by using answers materialized as part of previous workflow execution runs in the system.

In another aspect, a system for evolutionary analytics supports the three dimensions through rewriting workflows to be more efficient by using answers materialized as part of previous workflow execution runs in the system. The system integrates a query rewriting component with an existing query execution engine that is used by analysts. An optimizer takes a query written in some declarative language and translates it into an execution plan that consists of MR jobs. The target execution engine is extended by integrating a rewriter 14, as well as a materialized view metadata store 16.

Implementations of the above system may include one or more of the following. Queries are expressed against the base data, which are large logs and queries contain UDFs. Each MR job materializes its output to the stable storage (e.g., HDFS in Hadoop). In one embodiment, the optimizer can provide cost estimates for UDFs admitted to the system. To let the rewriter communicate with the optimizer of the target engine, the optimizer is extended to generate a plan with two types of annotations on each plan node: (1) a logical expression of its computation and (2) an estimated execution cost. The rewriter uses the logical expression in the annotation when searching for rewrites for the output of a node. The expression consists of relational operators or UDFs. For each rewrite found during the search, the rewriter utilizes the optimizer to obtain a plan and estimated cost. During query execution, all by-products of query processing are retained as opportunistic materialized views, and stored in the system becoming part of its opportunistic physical design configuration. The materialized view metadata store contains information about the materialized views currently in the system such as the view definitions, and standard data statistics used in query optimization.

Advantages of the preferred embodiments may include one or more of the following. The system is less complex. From the user's perspective—the rewrite is done automatically without the user's guidance or hints. From the system perspective—the physical design is automated and continuously tuned without provider's guidance. The system algorithmically finds the optimal rewrite in a work-efficient manner. Moreover, faster operation is achieved. From the user and system perspective—the method guarantees that the system provides the cheapest possible (optimal) rewrite of an analysts query using the existing artifacts in the system. From an algorithmic perspective—the algorithm searches the minimal amount of solution space to find the optimal rewrite due to OPTCOST, this is done without pruning the solution space. The workflow rewriting technique that finds the optimal rewrite of an evolutionary workflow in a work efficient manner by producing a rewrite that uses all available artifacts in the system to reduce workflow execution time. This results in faster performance from the user's point of view, and a reduction in the amount of system resources consumed to answer the query from the system provider's point of view. The use of the optimistic cost function OPTCOST enables the workflow rewrite algorithm to incrementally search the space of rewrites, which enables the system to create (explode) and search the minimum amount of the solution space necessary to find the optimal rewrite. The gray-box model of a UDF is expressive yet conducive to rewrites. The gray-box approach allows any user to add a UDF to the system with a low amount of effort. This allows the system to search for rewrites of the UDF, and any other analyst to use that UDF. Additionally the system operator may also choose to extend the rewrite language to include the UDF, but with a higher amount of effort. This model more generic and more expressive than hints alone.

DESCRIPTION

Figure 1:
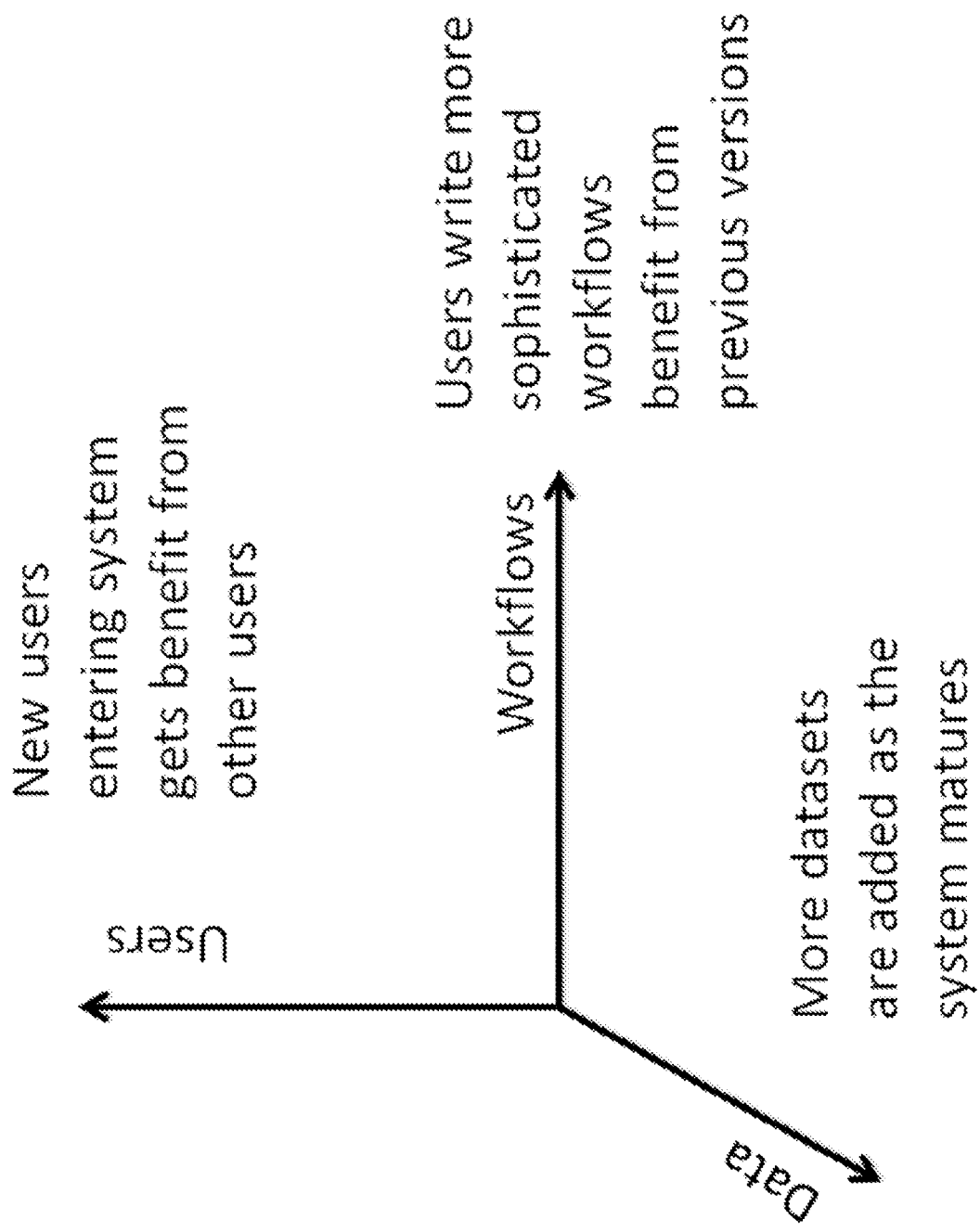
FIG. 1 shows a flexible system that can simultaneously support three dimensions of evolution.

FIG. 1 shows a flexible system that can simultaneously support three dimensions of evolution—workflows, users, and the data. We call this an evolutionary system. Evolutionary query workflows are those written by analysts as they iteratively explore the data. The result of an evolutionary workflow W may not initially produce the desired answer as the user lacks sufficient understanding of the data to be able to translate his/her intent to a query. Typically, W will be reformulated as a new workflow W', and this process repeats. Workflow evolution is defined by a single analyst adjusting, modifying, and re-purposing a workflow to better align the results of the workflow to match the analyst's intent. User evolution is defined as new analysts arriving that begin querying the system with new workflows. Data evolution is defined as the process of an analyst adding a new data source (e.g., logs) to the system.

In this system, workflow evolution is defined by a single analyst adjusting, modifying, and re-purposing a workflow to better align the results of the workflow to match the analyst's intent. User evolution is defined as new analysts arriving that begin querying the system with new workflows. Data evolution is defined as the process of an analyst adding a new data source (e.g., logs) to the system.

The system supports these three dimensions through rewriting workflows to be more efficient by seamlessly retaining and reusing artifacts (intermediate and final answers) from previous query/workflow execution runs in the system, which reduces the execution time of a new query. These artifacts can be referred to as materialized views.

An analyst in our use case typically revises the workflow multiple times by examining previous results and modifying the original workflow. This way analyst has the freedom to explore their intuition in any direction as they move toward their desired answer. Workflow modifications can include adding a new data source, changing a sub-goal, changing parameters, or replacing some operations in the workflow with a UDF. One embodiment captures these types of modifications in our microbenchmark. Analysts can extend the language of the workflow by adding a new UDF to the system then the UDF becomes available to all the other analysts.

A service provider is the other player in the system, and as the platform manager wants to ensure good system performance. The provider must consider tradeoffs between maximizing performance for a single user versus performance for the community of the users. The provider can extend the language of the rewrites by adding more UDFs. Extending the rewrite language with a UDF can benefit the analysts by finding better rewrites, but makes the rewrite search space larger which increases the time taken to find a good rewrite. Even though the rewrite language includes a rich and extensible set of transformations, it is to be expected that the language of the rewrite is less expressive than the language of the workflow. The provider also has to decide which materialized views to retain. Because storage space is not infinite a garbage collector is required.

Queries in our scenario are likely to include complex analytical operations expressed as UDFs. In order to reuse previous computation in our system effectively, we require a way to model UDFs semantically.

Possibilities for modeling UDFs may include white, gray, or black-box approaches with varying levels of overhead and complexity to the system. A white box approach requires a complete description of the UDF such that the system understands how the UDF transforms the inputs. This approach has high overhead for an analyst when adding a new UDF to the system. A black box approach has very low overhead for an analyst but produces an output that is completely opaque to the system thus may not be suitable for our goal of reusing results. Since UDFs can involve fairly complex operations on the data, our system adopts a gray-box approach that only captures the end-to-end transformations performed by a UDF. By end-to-end transformations, we imply that our model can capture fine-grain dependencies between the input and output tuples, although our UDF model does not know anything more about the computation. This requires additional work to provide the gray-box model when adding a new UDF, yet allows the system to understand the UDF's transformations in a useful way. A black-box model, on the other hand, can only track coarse-grain dependency between input and output as a whole.

A UDF in our gray-box model is written as a composition of local functions. A local function refers to a function that operates on a single tuple or a single group of tuples. One embodiment restricts a local function to perform the following operations:
1. Discard or add attributes
2. Discard tuples by applying filters
3. Perform grouping of tuples The gray-box model does not understand the nature of the transformation performed by the local functions however it understands the transformation afforded by each local function. The end-to-end transformation of the UDF can be obtained by composing the operations performed by each local function in the UDF.

Following the gray-box model, the input and output of every node in the plan is captured by three properties: attributes A, filters F, and group-by G. F is the conjunction of all filters applied to the input data, G is the current grouping applied, and A captures the schema. The end-to-end transformation of a UDF can be expressed as the transformation of the input to the output using the composition of the local functions. Note that the composition captures the semantics of the end-to-end transformation using the three operations, but not the actual computation and not to describe the internal procedure. By combining these with grouping, the model can express rich UDFs, as well as relational operators such as select, project, join, group-by and aggregation. Joins are modeled in the standard way in MapReduce which is to group multiple relations on a common key.

Figure 2:
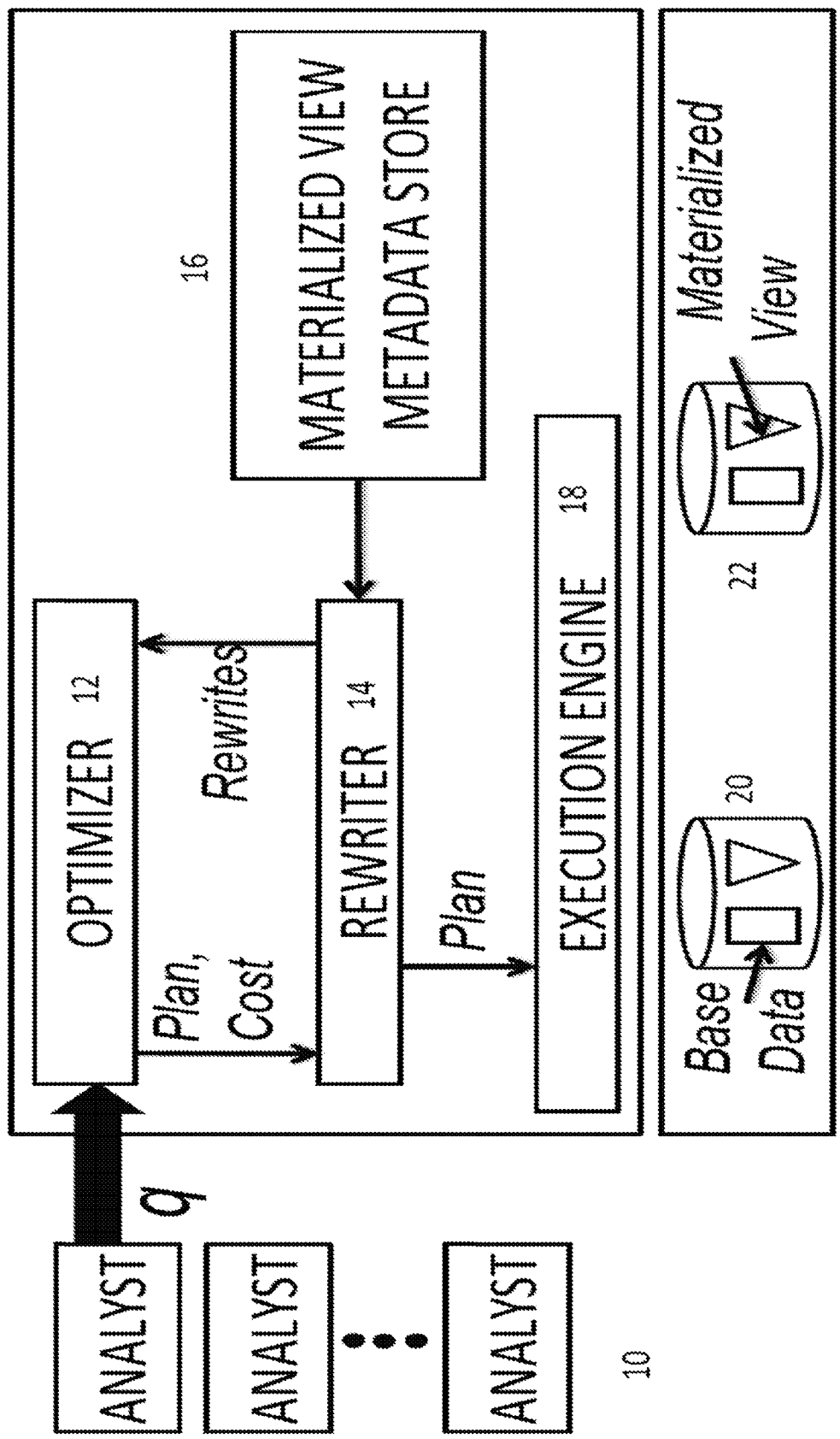
FIG. 2 shows an exemplary high level overview of a system framework showing control flows.

FIG. 2 shows an exemplary high level overview of a system framework showing control flows. The system supports these three dimensions through rewriting workflows to be more efficient by using answers materialized as part of previous workflow execution runs in the system. The system integrates a query rewriting component with an existing query execution engine that is used by analysts 10. An optimizer 12 takes a query written in some declarative language and translates it into an execution plan that consists of MR jobs. Queries are expressed against the base data, which are large logs and queries contain UDFs. Each MR job materializes its output to the stable storage (e.g., HDFS in Hadoop). In this embodiment, the optimizer can provide cost estimates for UDFs admitted to the system. The target execution engine is extended by integrating a rewriter 14, as well as a materialized view metadata store 16. To let the rewriter 14 communicate with the optimizer of the target engine, the optimizer 12 is extended to generate a plan with two types of annotations on each plan node: (1) a logical expression of its computation and (2) an estimated execution cost. The rewriter uses the logical expression in the annotation when searching for rewrites for the output of a node. The expression consists of relational operators or UDFs. For each rewrite found during the search, the rewriter utilizes the optimizer to obtain a plan and estimated cost. During query execution, all by-products of query processing are retained as opportunistic materialized views, and stored in the system becoming part of its opportunistic physical design configuration. The materialized view metadata store contains information about the materialized views currently in the system such as the view definitions, and standard data statistics used in query optimization.

The system can dramatically improve query performance by leveraging the built-in fault-tolerance mechanism of MR as an opportunistic physical design. Each MR job involves the materialization of intermediate results (the output of mappers, the input of reducers and the output of reducers) for the purpose of failure recovery. More generally, a multi-stage job, such as one that is generated by Pig or Hive, will involve several such materializations. We refer to these materialized results as the artifacts of query execution and note that they are generated automatically as a by-product of query processing.

Given the evolutionary nature of data exploration, it is likely that each query has similarities to previous queries by the same analyst, and even to queries of other analysts who examine the same data. For instance, several data analysts may perform sentiment analysis on a specific class of tweets (e.g., in a specific geographical area) but with a different hypothesis in mind. Hence, the computation performed by previous queries in the system, as captured in the generated artifacts, may be relevant for a new query.

Artifacts are treated as opportunistically-created materialized views and use them to rewrite a new query in the system. The opportunistic nature of the technique has several nice properties: the materialized views are generated as a by-product of query execution, i.e., without additional overhead; the set of views is naturally tailored to the current workload; and, given that large-scale analysis systems typically execute a large number of queries, it follows that there will be an equally large number of materialized views and hence a good chance of finding a good rewrite for a new query. the results with an implementation of this technique inside an industrial data-analytics system indicates that the savings in query execution time can be dramatic: a rewrite can reduce execution time by up to two orders of magnitude.

The query-rewrite technique targets the scenario of opportunistic materialized views within an MR system. The algorithm employs techniques inspired by spatial databases (specifically, nearest-neighbor searches in metric spaces) in order to aggressively prune the huge space of candidate rewrites and generate the optimal rewrite in an efficient manner. The system uses a gray-box UDF model that is simple but expressive enough to capture many common types of UDFs. This affords us a limited understanding of UDFs to enable effective reuse of previous results. The rewriting process takes as input a query and a set of views and outputs the optimal rewrite. The technique is work-efficient in that it considers the minimal set of views necessary to find the optimal rewrite under certain assumptions. Experimental results applying the methods provide execution time improvements up to two orders of magnitude using real-world data and realistic complex queries. The savings from the method are due to moving much less data, avoiding the high expense of re-reading data from raw logs when possible, and reusing/repurposing results from long-running computations including UDFs.

The query-rewrite process addresses the two main challenges: how to search the large space of rewrites, and how to reason about views that contain UDFs (a common feature in large-scale data analytics). The algorithm, which provably finds the minimum-cost rewrite, is inspired by nearest-neighbor searches in non-metric spaces. We present an extensive experimental study on real-world datasets with a prototype data-analytics system based on Hive. The results demonstrate that the approach can result in dramatic performance improvements on complex data-analysis queries, reducing total execution time by an average of 61% and up to two orders of magnitude.

Figure 3:
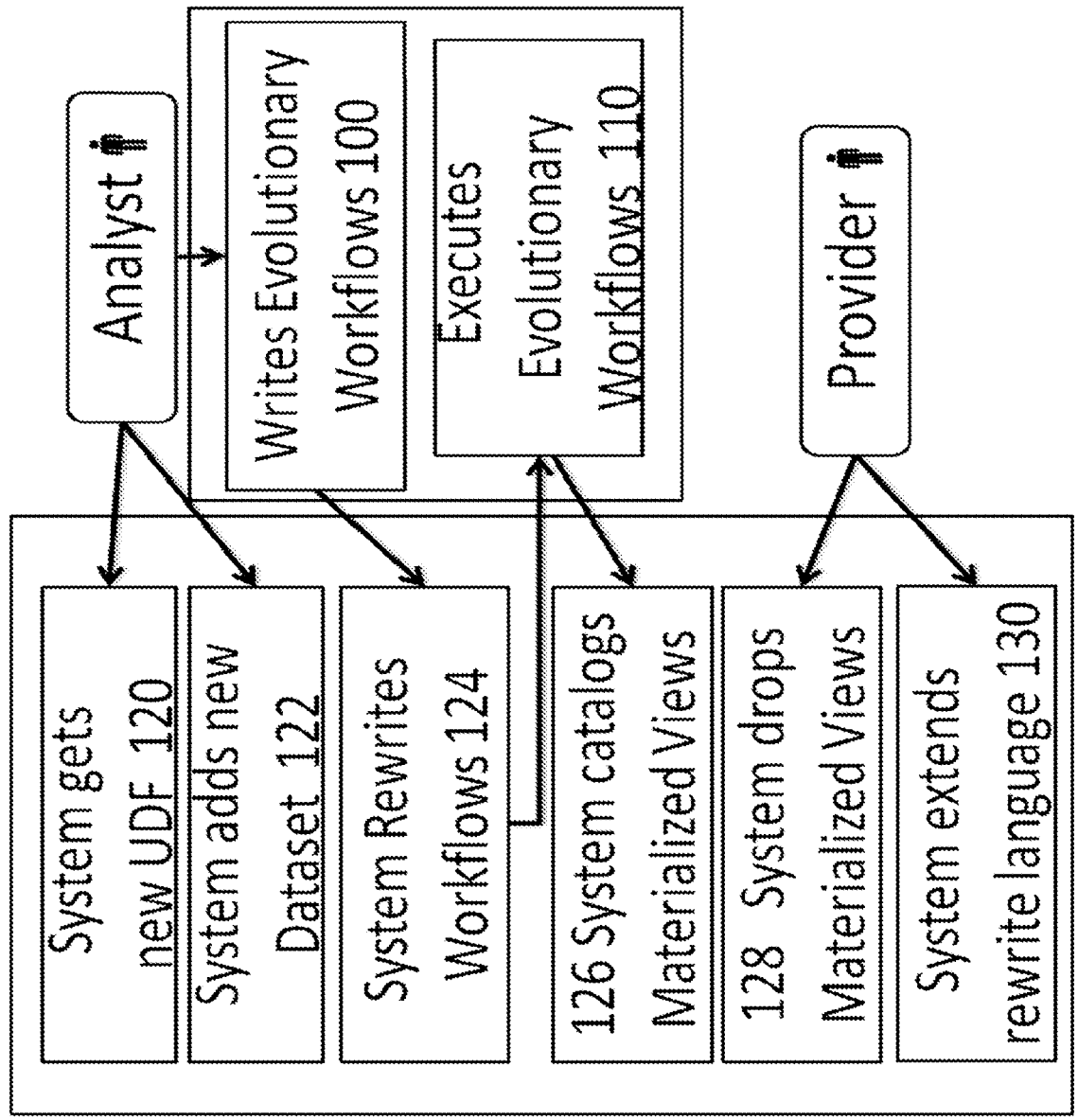
FIG. 3 shows an exemplary process supporting the evolution of workflows and new data sets in the system.

FIG. 3 shows an exemplary process supporting the evolution of workflows and new data sets in the system. The analyst writes one or more evolutionary workflows 100. The system gets a new UDF in 120, and the system adds new dataset in 122. The system rewrites the workflows in 124, from which evolutionary workflows are executed in 110. In 126, the system catalogs the materialized views. The provider can cause the system to drop the materialized views in 128. Alternatively, the system can be extended by rewriting the language in 130.

Figure 4:
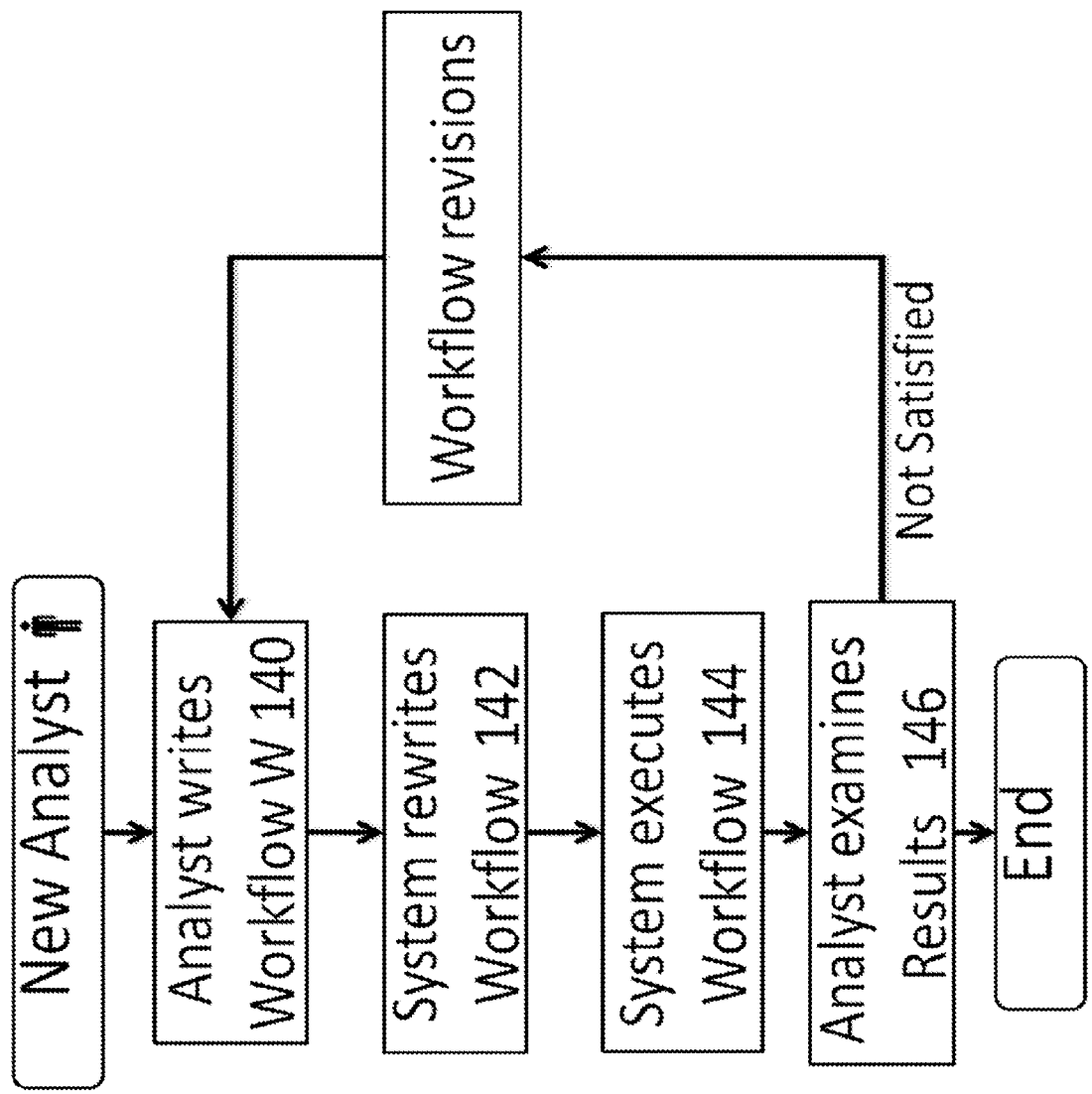
FIG. 4 shows an exemplary process for evolution of new users in the system.

FIG. 4 shows an exemplary process for evolution of new users in the system. Initially, a new analyst uses the system. The analyst writes a workflow W in 140. The system in turn rewrites the workflow in 142 and executes the workflow in 144. The analyst examines the results in 146, and if he/she is not satisfied, the analyst can revise the workflow and loop back to 140. Alternatively, if the analyst is satisfied, the process exits.

Figure 5:
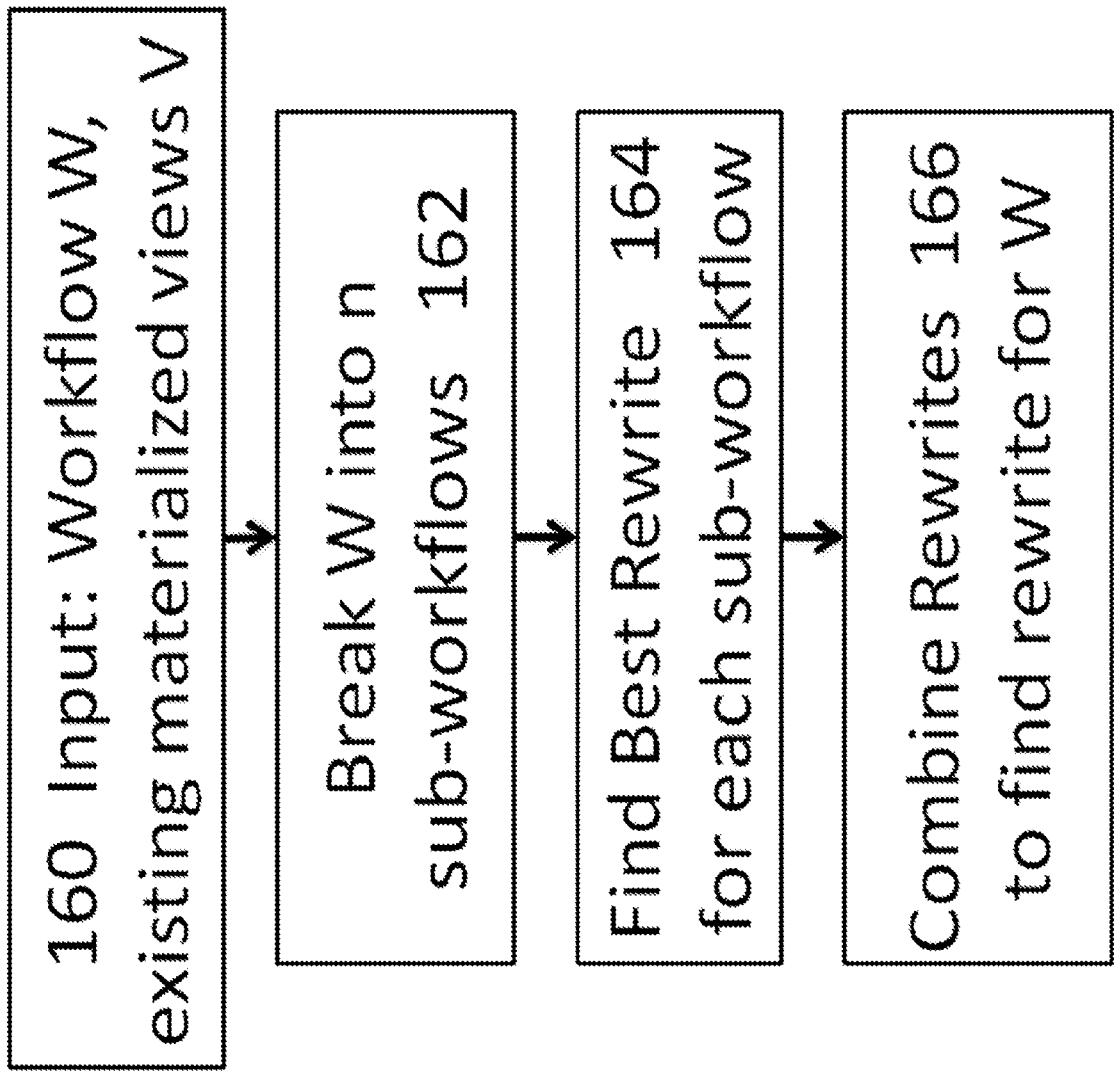
FIG. 5 shows an exemplary process for rewrites.

FIG. 5 shows an exemplary process for rewriting the workflow. The process receives as inputs workflow W and one or more existing materialized views V in 160. The process breaks W into n sub-workflows in 162. The process finds the best rewrite for each sub-workflow in 164. The process then combines the rewrites to find a rewrite for W in 166.

Figure 6:
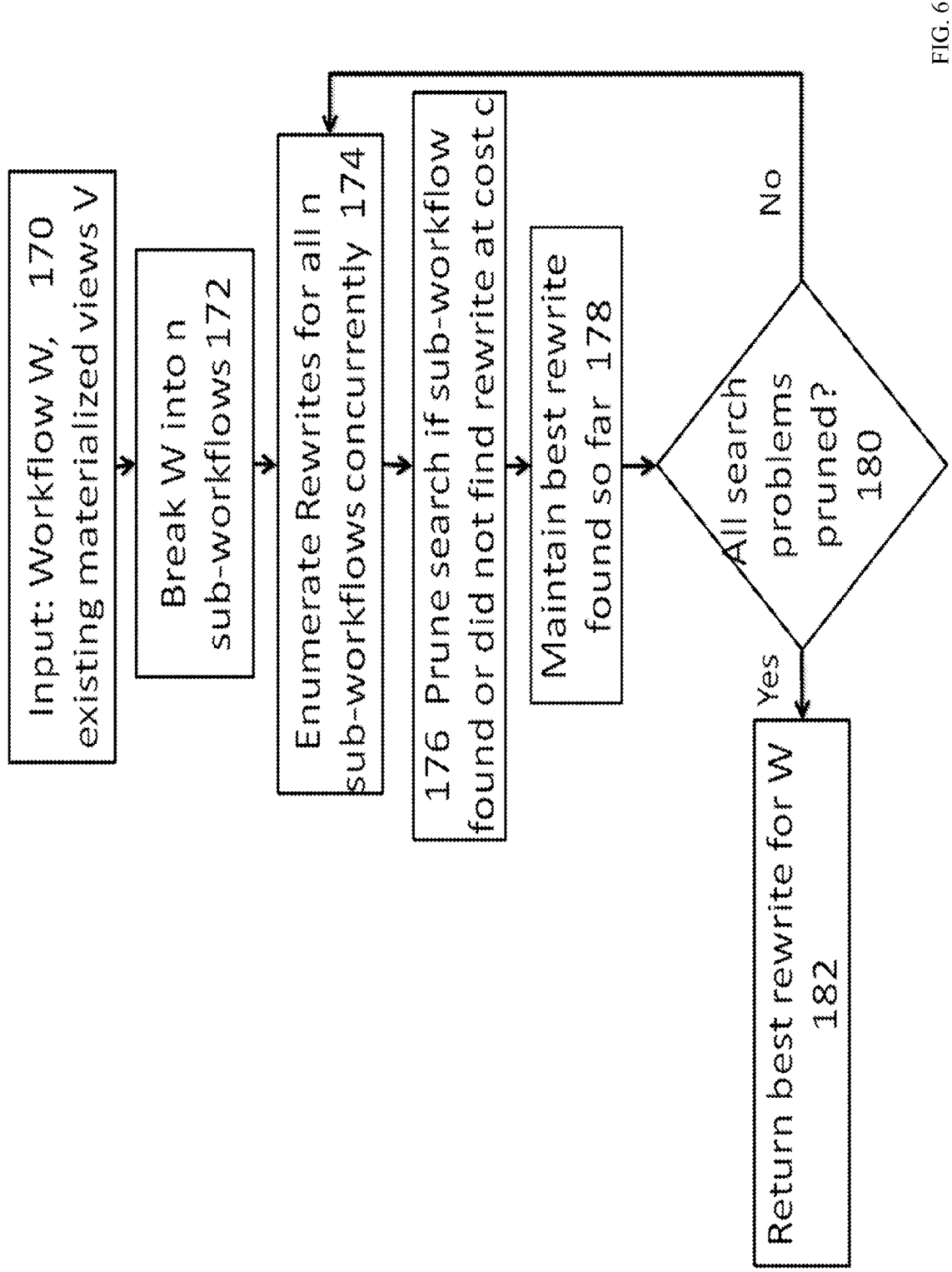
FIG. 6 shows an exemplary system that internally processes and maintains the workflows to support effective and efficient evolutions.

FIG. 6 shows an exemplary system that internally processes and maintains the workflows to support effective and efficient evolutions. In 170, the process receives as input the workflow W and existing materialized views V. The process breaks W into n sub-workflows in 172. The process enumerates rewrites for all n sub-workflows concurrently in 174. In 176, the process prunes the search in the sub-workflow could not find a rewrite at a cost c. The process maintains the best rewrite found so far in 178. Next, the process checks to see if all search problems have been pruned in 180. If not, the process loops back to 174 and otherwise the process returns the best rewrite for W in 182.

Figure 7:
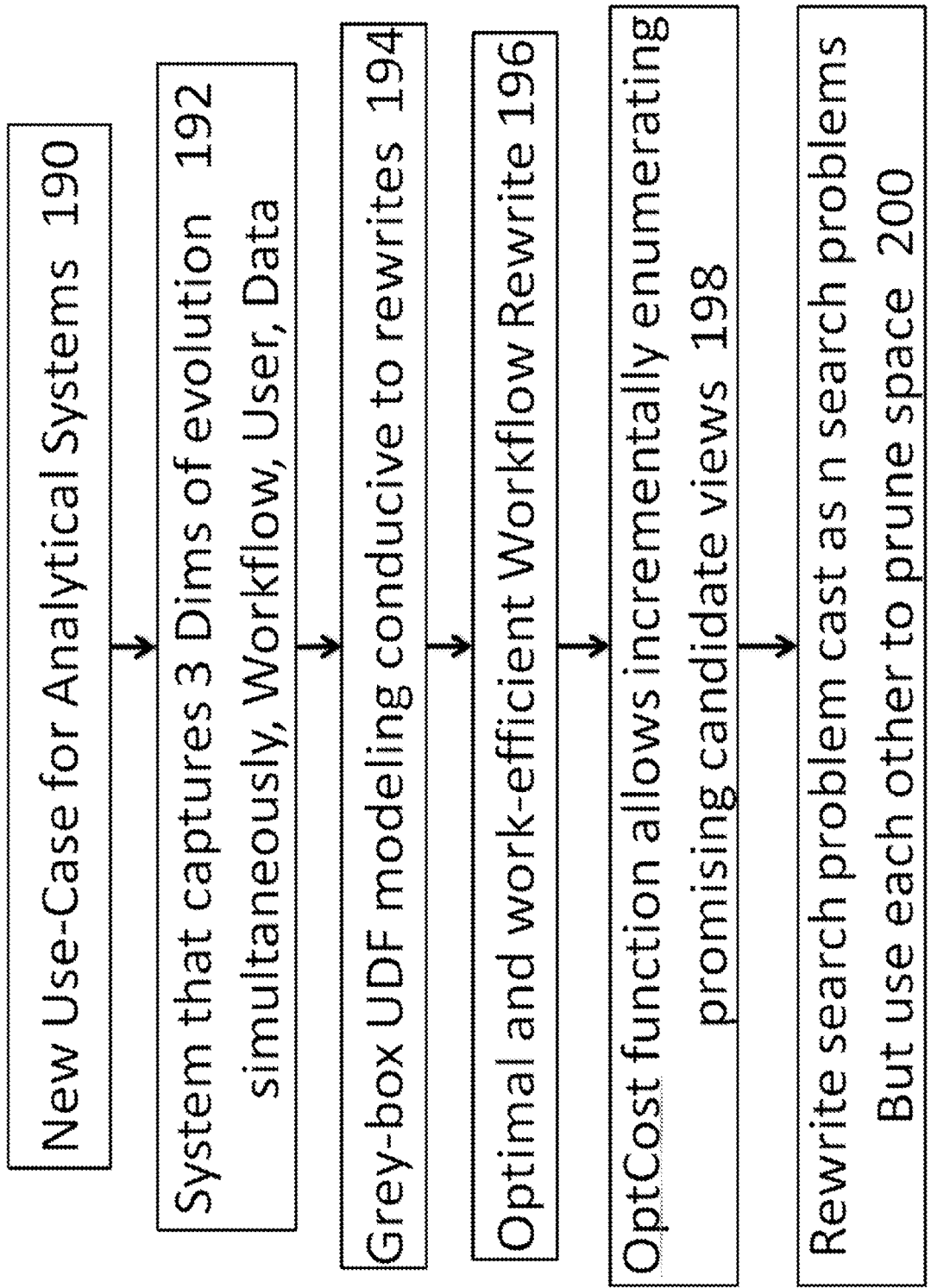
FIG. 7 shows an exemplary process to prune space.

FIG. 7 shows an exemplary process to prune space. In this process, a new use case is selected for an analytical system in 190. The system captures 3 dimensions of evolution simultaneously (workflow, user, and data) in 192. The process applies a gray-box UDF modeling technique conducive to rewrites in 194. The process also performs optimal and work-efficient workflow rewrite in 196. An OptCost function is used that allows incremental enumeration of promising candidate views in 198. The process then rewrites the search problem and casts the problem as n search problems, which are used to prune the search space in 200.

In one embodiment, the work efficient query rewriting algorithm searches the space at each target ordered by a lower bound on the cost of a rewrite using a view. The lower bound should not require finding a valid rewrite, as this is computationally expensive. We define an optimistic cost function OptCost($W_i$,v) that takes a candidate view v and target $W_i$ as inputs and provides a lower-bound on a rewrite $r_i$ of $W_i$ using v. $r_i$ is a rewrite of $W_i$ that uses the candidate view v. The property of the lower bound is $$\text{OptCost}(W_i, v) \leq \text{Cost}(r_i)$$

The use of a lower-bound cost is inspired by nearest neighbor finding problems in metric spaces where computing distances between objects can be computationally expensive, thus preferring an alternate distance function that is easy to compute with the desirable property that it is always less than or equal to the actual distance.

Given OptCost function, the rewrite algorithm finds the optimal rewrite r* of W by breaking the problem into two components:

1. BfRewrite performs an efficient search of rewrites for all targets in W and outputs a globally optimal rewrite for $W_n$.
2. ViewFinder enumerates candidate views for a single target based on their potential to produce a low-cost rewrite of the target, and is utilized by BfRewrite.

The BfRewrite algorithm produces a rewrite r of W that can be composed of rewrites found at multiple targets in W. The computed rewrite r* has provably the minimum cost among all possible rewrites in the same class. Moreover, the algorithm is work-efficient: even though Cost(r*) is not known a-priori, it will never examine any candidate view with OptCost higher than the optimal cost Cost(r*). Intuitively, the algorithm explores only the part of the search space that is needed to provably find the optimal rewrite.

The algorithm begins with W itself being the best rewrite for the plan. It then spawns n concurrent search problems at each of the targets in W and works in iterations to find a better rewrite. In each iteration, the algorithm chooses one target $W_i$ and examines a candidate view at $W_i$. The algorithm makes use of the result of this step to aid in pruning the search space of other targets in W. To be work efficient, the algorithm must choose correctly the next candidate view to examine. As we will show below, the OptCost functionality plays an essential role in choosing the next target to refine.

The BfRewrite uses an instance of the ViewFinder to search the space of rewrites at each target. ViewFinder is a black box that provides the following functions: (1) Init creates the search space of candidate views ordered by their OptCost, (2) Peek provides the OptCost of the next candidate view, and (3) Refine tries to find a rewrite of the target using the next candidate view. One important property of Refine is the following: there are no remaining rewrites to be found for the corresponding target that have a cost less than the value of Peek.

The key feature of ViewFinder is its OptCost functionality which is used by the BfRewrite to explore the space in an incremental manner and prune unnecessary sub-spaces as shown in Section 4.1. As noted earlier, rewriting queries using views is known to be a hard problem. Traditionally, methods for rewriting queries using views for the class of SPJG queries use a two stage approach. The prune stage determines which views are relevant to the query, and among the relevant views those that contain all the required join predicates are termed as complete, otherwise they are called partial solutions. This is typically followed by a merge stage that joins the partial solutions using all possible equijoin methods on all join orders to form additional relevant views. The algorithm repeats until only those views that are useful for answering the query remain.

We take a similar approach in that we identify partial and complete solutions, then follow with a merge phase. The ViewFinder considers candidate views C when searching for rewrite of a target. C includes views in V as well as views formed by "merging" views in V using a Merge function, which is an implementation of a standard view-merging procedure. Traditional approaches merge all partial solutions to create complete solutions, and continues until no partial solutions remain. This "explodes" the space of candidate views exponentially. the approach allows for a gradual explosion of the space as needed, which results in far fewer candidates views from being considered.

With no early termination condition existing approaches would have explore the space exhaustively at all targets. Thus we desire a rewriting algorithm that can enumerate the space and incrementally explore only as much as required, frequently stopping and resuming the search as requested by BfRewrite. We note that while an equivalent rewrite for a target may exist, the ViewFinder may never be asked to find it.

The ViewFinder is presented in Algorithm 4. At a high level, the ViewFinder is stateful which enables the BfRewrite to start, stop and resume the incremental searches at each target. The ViewFinder maintains state using a priority queue of candidate views. The ViewFinder implements three functions Init, Peek and Refine which we describe next.

The Init function instantiates an instance of the ViewFinder with a query which a logical representation of a target $W_i \in W$ and a set of materialized views V present in the system. Next, query is assigned to q and each view in V is added to priority queue using OptCost (q,v) as the sorting key. At the end of Init, the candidate views in PQ includes only those views in V.

The Peek function is used by BfRewrite to obtain the OptCost of the head item in the PQ. The Refine function is invoked when BfRewrite asks the ViewFinder to examine the next candidate view. At this stage, the ViewFinder pops the head item v out of PQ. The ViewFinder then generates a set of new candidate views M by merging v with previously popped candidate views (i.e., views in Seen), thereby incrementally exploding the space of candidate views. Note that Seen contains candidate views that have an OptCost less than or equal to that of v. M only retains those candidate that are not already in Seen, which are then inserted into PQ. A property of OptCost provided as a theorem later is that the candidate views in M have an OptCost that is greater than that of v and hence none of these views should have been examined before v. This property enables a gradual explosion of the space of candidate views. Then, v is added to Seen.

If v is guessed to be complete, we try to find rewrites of q using v by invoking the RewriteEnum function. Among the rewrites found by RewriteEnum, the cheapest rewrite is returned to BfRewrite as the result. To determine if a view v is partial or complete with respect to a query q, we take an optimistic approach. This approach represents a guess that a complete rewrite exists using v. A guess requires the following necessary conditions that a view must satisfy to participate in a rewrite of q, although these conditions are not sufficient to confirm the existence of an equivalent rewrite using v.

(a) v contains all the attributes required by q; or contains all the necessary attributes to produce those attributes in q that are not in v (b) v contains weaker selection predicates than q (c) v is less aggregated than q The function GuessComplete(q,v) performs these checks and returns true if v satisfies the properties with respect to q. These conditions under-specify the requirements for determining that a valid rewrite exists, thus a guess may result in a false positive, but will never result in a false negative.

The RewriteEnum algorithm attempts to produce a valid rewrite of a query using a view that is guessed to be complete. The rewrite returned represents the cheapest among all possible equivalent rewrites of q using v. The cost of a rewrite is evaluated by the Cost function, and corresponds to the cheapest execution plan that implements the rewrite. Equivalence is determined by ensuring that the rewrite and query contain the same attributes, filters, and group-by.

We enumerate equivalent rewrites of q by applying compensations to a guessed to be complete view v using $L_R$. We do this by generating all permutations of required compensations and testing for equivalence, which amounts to a brute force enumeration of all possible rewrites given $L_R$. This makes case for the system to keep $|L_R|$ small. When $L_R$ is restricted to a known, fixed set of operators it may suffice to examine a polynomial number of rewrites attempts, as in [?] for the specific case of simple aggregations involving group-bys. Such approaches are not applicable to the case as the system should have the flexibility of extending $L_R$ with UDFs from $L_W$ when it results in overall system benefit.

Given the computational cost of finding valid rewrites, BfRewrite limits the invocation of RewriteEnum algorithm using two strategies. First, we avoid having to apply RewriteEnum on every candidate view making a guess for the completeness of a view based on the three properties described earlier. Second, we delay the application of RewriteEnum to every complete view by determining a lower bound on the cost of a rewrite using v should one exist. For the lower bound we use the OptCost, which is described in the next section.

The system performs the enumeration of the candidate views based their potential to provide a low cost rewrite. OptCost relies on the non-subsumable cost property of the Cost function to arrive at a lower-bound. Given that v is guessed to be complete with respect to q, a set difference between the attributes, filters and group-bys representation of q and v is referred to as the fix. Fix denotes a hypothetical local function that can transform v's representation into q's. Note that a UDF containing such a local function may not really exist. We have to invoke RewriteEnum which produces a rewrite containing compensations from $L_R$. The composition of the local functions in the compensation transforms v's representation to q. Finally, note that the existence of fix guarantee that v will result in a valid rewrite for the same reason that guessed to be complete can result in a false positive. Both assume that the required compensation operations can be applied independently of each other to v.

The OptCost function has two properties that it is a lower bound on the cost of any plan returned by RewriteEnum(q,v) and inexpensive to compute. If v is a materialized view then $c_1$ is equal to the cost of accessing v. Otherwise, if v results from the merging of views, then $c_1$ is the total cost to access the constituent views of v. We denote $c_2$ as the cost of merging the constituent views in v (i.e., creation cost) if v is already not materialized, else $c_2$=0 if it is already materialized. We denote $c_3$ as the cost of applying the least expensive operation in the fix on v, obtained by invoking the Cost to obtain the cost of performing each of the operations in the fix on v. $c_3$ is obtained by min(Cost(x,v)) such that x is an operation in fix.

The OptCost of v with respect to q is given by: $c=c_1+c_2+c_3$, where c is less than the cost of any plan of the rewrite using v. If v is partial with respect to q, then $c_3$=0 since no compensation should be applied.

The optimizer can generate plans where some of compensations can be pushed into the candidate view v before materializing it. In this case, OptCost can provide a weaker lower bound as it can only consider the cost ($c_1$) of accessing all the constituent views of v plus the minimum cost $c_3$' of applying the least expensive operation in the fix on any constituent views of v or on any intermediate view that can be created in the process of creating v. If v is partial with respect to q, then OptCost only includes $c_1$. In general, c is a lower-bound on on the cost of any plan yielded by an equivalent rewrite r of q using v if one exists. In order to find the lowest cost r, RewriteEnum applies all permutations of compensation operations to achieve an equivalent rewrite. Regardless of how many operations are used in the compensation, by Definition 1, the cost of applying the compensations has to be at least as expensive as the cheapest operation $c_3$ in the fix.

Next the OptCost function is analyzed for the case involving push-down of compensations. For this case, both the ordering of the merges of the constituent views of v as well as the applicable compensations are as yet unknown. the lower-bound holds as it does not make any assumptions about the ordering of the constituent views in v (i.e., by using $c_1$) as well as the position of any compensation operator in any plan of r (i.e., $c_3$'). The OptCost of every candidate view in M that is not in Seen is greater than or equal to the OptCost of v.

Pseudo-code for algorithms 1-4 are shown below.

---

Algorithm 1 Optimal rewrite of W using VIEWFINDER

1: function BFREWRITE(W, V)
2:     for each $W_i \in$ W do           ▷ Init Step
3:         VIEWFINDER.INIT($W_i$, V)
4:         BSTPLN$_i \leftarrow W_i$      ▷ original plan to produce $W_i$

Algorithm 1 Optimal rewrite of W using VIEWFINDER

```
 5:      BSTPLNCST_i ← COST(W_i)           ▷ plan cost
 6:    end for
 7:    repeat
 8:      (W_i,d) ← FINDNEXTMINTARGET(W_n)
 9:      REFINETARGET(W_i) if W_i ≠ NULL
10:    until W_i = NULL
11:    Rewrite W using BSTPLN_n
12: end function
```

Algorithm 2 Find next min target to refine

```
 1: function FINDNEXTMINTARGET(W_i)
 2:    d^i ← 0; W_MIN ← NULL; d_MIN ← ∞
 3:    for each incoming vertex NODE_j of NODE_i do
 4:      (W_k, d) ← FINDNEXTMINTARGET(W_j)
 5:      d^i ← d^i + d
 6:      if d_MIN > d and W_k ≠ NULL then
 7:        W_MIN ← W_k
 8:        d_MIN ← d
 9:      end if
10:    end for
11:    d^i ← d^i + COST(NODE_i)
12:    d_i ← VIEWFINDER.PEEK( )
13:    if min(d^i,d_i) ≥ BSTPLNCST_i then
14:      return (NULL, BSTPLNCST_i)
15:    else if d^i < d_i then
16:      return (W_MIN, d^i)
17:    else
18:      return (W_i, d_i)
19:    end if
20: end function
```

Algorithm 3 Queries VIEWFINDER in best-first manner

```
 1: function REFINETARGET(W_i)
 2:    r_i ← VIEWFINDER.REFINE(W_i)
 3:    if r_i ≠ NULL and COST(r_i) < BSTPLNCST_i then
 4:      BSTPLN_i ← r_i
 5:      BSTPLNCST_i ← COST(r_i)
 6:      for esch edge (NODE_i, NODE_k) do
 7:        PROPBSTREWRITE(NODE_k)
 8:      end for
 9:    enf if
10: end function
 1: function PROPBSTREWRITE(NODE_i)
 2:    r_i ← plan initialized to NODE_i
 3:    for each edge (NODE_j, NODE_i) do
 4:      Add BSTPLN_j to r_i
 5:    end for
 6:    if COST(r_i) < BSTPLNCST_i then
 7:      BSTPLNCST_i ← COST(r_i)
 8:      BSTPLN_i ← r_i
 9:      for each edge (NODE_i, NODE_k) do
10:        PROPBSTREWRITE(NODE_k)
11:      end for
12:    end if
13: end function
```

Algorithm 4 VIEWFINDER

```
 1: function INIT(query, V)
 2:    Priority Queue PQ ← 0; Seen ← 0; Query q
 3:    q ← query
 4:    for each s ∈ V do
 5:      PQ.add(n,OPTCOST(q,v))
 6:    end for
 7: end function
 1: function PEEK
 2:    if PQ is text empty return PQ.peek( ).OPTCOST else ∞
 3: end function
 1: function REFINE
 2:    if not PQ.empty( ) then
 3:      v ← PQ.pop( )
 4:      M ← MEEGE(v, Seen) ▷ Discard from M those in Seen ∩ M
 5:      for each r^i ∈ M do
 6:        PQ.add(r^i, OPTCOST(q, r^i))
 7:      end for
 8:      Seen.add(v)
 9:      if GUESSCOMPLETE(q, v) then
10:        returnREWRITEENUM(q, v)
11:      end if
12:    end if
13:    return NULL
14: end function
```

The above method takes advantage of opportunistic materialized views to significantly speedup queries in a large-scale data analytics system. With the aid of a UDF model and a lower-bound OptCost function, the BfRewrite algorithm produces the optimal rewrite while being work efficient. Various evolutionary queries for realistic scenarios and demonstrated dramatic performance improvements with an average of 61% and up to two orders of magnitude. The system can identify the most beneficial views to retain. View retention strategies can be developed from the point of overall system benefit considering these decisions are affected by view maintenance costs.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Those skilled in the art can now appreciate from the foregoing description that the broad teachings of the present invention can be implemented in a variety of forms. As can be appreciated, steps of methods disclosed and claimed can be performed in an order that is different than that described and claimed herein without departing from the spirit of the present invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method to support evolutionary queries, comprising:
   retaining artifacts from previous query or workflow execution runs materialized views;
   providing a gray-box model of a user defined function (UDF) to support search for rewrites of the UDF;
   automatically producing a rewrite that uses artifacts to reduce workflow execution time;
   incrementally searching the space of rewrites to create explode and searching a minimum amount of a solution space to find an optimal rewrite;
   supporting simultaneous evolution along three dimensions including workflow, user and data evolution; and
   determining the optimal rewrite r* of W by:
   performing an efficient search of rewrites for all targets in W and outputs a globally optimal rewrite for $W_n$; and
   enumerating one or more candidate views for a single target based on their potential to produce a low-cost rewrite of the target.

2. The method of claim 1, comprising extending the rewrite language to include the UDF.

3. The method of claim 1, comprising determining an optimistic cost function OptCost($W_i$, v) that takes a candidate view v and target $W_i$ as inputs and providing a lower-bound on a rewrite $r_i$ of $W_i$ using v, where $r_i$ is a rewrite of $W_i$ that uses the candidate view v and where a property of the lower bound is determined as:

$$\text{OptCost}(W_i,v) \leq \text{Cost}(r_i).$$

4. The method of claim 3, comprising creating the search space of candidate views ordered by OptCost, providing the OptCost of a next candidate view, and determining a rewrite of the target using the next candidate view.

5. The method of claim 1, comprising producing a rewrite r* of W composed of rewrites found at multiple targets in W, wherein the computed rewrite r* has a minimum cost among rewrites in the same class.

6. The method of claim 1, comprising:
   using W as a rewrite for a plan;
   spawning n concurrent search problems at each target in W and iteratively finding a better rewrite, wherein each iteration chooses one target $W_i$ and examines a candidate view at $W_i$; and
   using the better rewrite results for pruning a search space of other targets in W.

7. The method of claim 1, comprising optimizing execution of UDFs over unstructured data sets.

8. The method of claim 1, comprising optimizing for evolution of user workflows.

9. A system to support evolutionary analytical queries, comprising:

a processor configured for enabling an optimizer receiving a query from the input and translating the query into an execution plan, the processor coupled to a storage, and input and output connections;

the processor configured for enabling a query rewriter coupled to the optimizer to support simultaneous evolution along three dimensions including workflow, user and data evolution;

storage with a materialized view metadata store coupled to the query rewriter, the store containing information about materialized views including view definitions and standard data statistics used in query optimization;

the processor configured for enabling a query execution engine within the computer coupled to the query rewriter to execute the query; and the processor configured for a rewriter for determining the optimal rewrite r* of W by:
   performing an efficient search of rewrites for all targets in W and outputs a globally optimal rewrite for $W_n$; and enumerating one or more candidate views for a single target based on their potential to produce a low-cost rewrite of the target.

10. The system of claim 9, wherein queries are expressed against base data including large logs and queries contain UDFs.

11. The system of claim 9, wherein the optimizer provides cost estimates for UDFs admitted to the system.

12. The system of claim 9, wherein the optimizer generates a plan with two types of annotations on each plan node: (1) a logical expression of its computation and (2) an estimated execution cost.

13. The system of claim 9, wherein the rewriter uses the logical expression in the annotation when searching for rewrites for the output of a node.

14. The system of claim 13, wherein the expression consists of relational operators or UDFs.

15. The system of claim 9, for each rewrite found during the search, the rewriter utilizes the optimizer to obtain a plan and estimated cost.

16. The system of claim 9, wherein by-products of query processing during query execution are retained as opportunistic materialized views and stored as an opportunistic physical design configuration.

17. The system of claim 9, comprising computer code for determining an optimistic cost function OptCost($W_i$, v) that takes a candidate view v and target $W_i$ as inputs and providing a lower-bound on a rewrite $r_i$ of $W_i$ using v, where $r_i$ is a rewrite of $W_i$ that uses the candidate view v and where a property of the lower bound is determined as:

$$\text{OptCost}(W_i,v) \leq \text{Cost}(r_i).$$

18. The system of claim 17, comprising computer code for creating the search space of candidate views ordered by OptCost, providing the OptCost of a next candidate view, and determining a rewrite of the target using the next candidate view.

19. The system of claim 9, comprising computer code for:
   using W as a rewrite for a plan;
   spawning n concurrent search problems at each target in W and iteratively finding a better rewrite, wherein each iteration chooses one target W, and examines a candidate view at $W_i$; and
   using the better rewrite results for pruning a search space of other targets in W.

* * * * *